United States Patent
Lumetta et al.

(10) Patent No.: US 9,306,381 B2
(45) Date of Patent: Apr. 5, 2016

(54) ELECTRICAL DEVICE HAVING BUSBAR WITH FLEXIBLE WELD CRIMP

(71) Applicants: Yazaki North America, Inc., Canton, MI (US); Yazaki Corporation, Tokyo (JP)

(72) Inventors: Jeffrey Lumetta, Canton, MI (US); Tomohiro Ikeda, Tokyo (JP); Koji Koizumi, Tokyo (JP)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 14/538,357

(22) Filed: Nov. 11, 2014

(65) Prior Publication Data

US 2015/0136476 A1     May 21, 2015

Related U.S. Application Data

(60) Provisional application No. 61/904,630, filed on Nov. 15, 2013.

(51) Int. Cl.
    *H01R 24/00*      (2011.01)
    *H02G 5/02*      (2006.01)
    (Continued)

(52) U.S. Cl.
    CPC ............... *H02G 5/025* (2013.01); *H01R 4/023* (2013.01); *H01R 4/187* (2013.01); *H01R 4/64* (2013.01); *H01R 12/57* (2013.01); *H01R 12/53* (2013.01); *H01R 25/14* (2013.01)

(58) Field of Classification Search
    CPC ............................ H01R 11/288; H01R 9/0735
    USPC .................................... 439/627, 736, 500, 77
    See application file for complete search history.

(56) References Cited

U.S. PATENT DOCUMENTS

| 6,106,310 A | 8/2000 | Davis et al. |
| 6,824,630 B2 | 11/2004 | Oishi et al. |

(Continued)

FOREIGN PATENT DOCUMENTS

| DE | 19852877 A1 | 5/1999 |
| EP | 0286031 A2 | 10/1988 |

(Continued)

OTHER PUBLICATIONS

European Search Report issued on Apr. 23, 2015 for European Patent Application No. 14193242.6.

(Continued)

*Primary Examiner* — Phuongchi T Nguyen
(74) *Attorney, Agent, or Firm* — Harness, Dickey & Pierce, P.L.C.

(57) ABSTRACT

An electrical device according to the principles of the present disclosure includes a frame, a conductor having a conductive element and an electrically insulating cover disposed about at least a portion of the conductive element, and a busbar mounted to the frame. The busbar includes a busbar body and a weld crimp. The weld crimp has a base, which extends from the busbar body, and a cross-member that is coupled to the base on a side of the base that is opposite the busbar body. The cross-member has a weld portion and a crimp portion. The weld portion intersects the base. The crimp portion intersects the weld portion and has a crimp member that receives the conductor. The crimp member is permanently deformed about the conductor so as to apply a clamping force to the conductor. The conductive element is welded to the weld portion.

20 Claims, 4 Drawing Sheets

(51) Int. Cl.
*H01R 4/02* (2006.01)
*H01R 4/18* (2006.01)
*H01R 4/64* (2006.01)
*H01R 12/57* (2011.01)
*H01R 12/53* (2011.01)
*H01R 25/14* (2006.01)

(56) References Cited

U.S. PATENT DOCUMENTS

| | | | |
|---|---|---|---|
| 7,683,254 | B2 | 3/2010 | Shimizu |
| 7,686,625 | B1 | 3/2010 | Dyer et al. |
| 8,023,272 | B2 | 9/2011 | Shimizu |
| 8,690,588 | B2 | 4/2014 | Jetton et al. |
| 8,692,418 | B2 | 4/2014 | Ikeda et al. |
| 8,765,289 | B2 | 7/2014 | Ikeda et al. |
| 8,816,538 | B2 | 8/2014 | Ikeda et al. |
| 8,822,062 | B2 | 9/2014 | Ikeda et al. |
| 8,973,879 | B2 | 3/2015 | Kodama et al. |
| 2004/0043663 | A1* | 3/2004 | Ikeda .................. H01M 2/206 439/627 |
| 2007/0072455 | A1 | 3/2007 | Onuma et al. |
| 2012/0015550 | A1* | 1/2012 | Ikeda .................. H01M 2/1077 439/391 |
| 2012/0208410 | A1* | 8/2012 | Ikeda .................. H01M 2/206 439/883 |
| 2012/0231640 | A1* | 9/2012 | Ikeda .................. H01M 2/1061 439/110 |
| 2012/0244759 | A1 | 9/2012 | Tsuji |
| 2013/0241493 | A1 | 9/2013 | Kosaki et al. |

FOREIGN PATENT DOCUMENTS

| | | |
|---|---|---|
| JP | H0992348 A | 4/1997 |
| JP | 2001319701 A | 11/2001 |
| JP | 2012059658 A | 3/2012 |
| JP | 2012204109 A | 10/2012 |

OTHER PUBLICATIONS

Japanese Office Action issued on Oct. 12, 2015 for Japanese Patent Application No. 2014-231304 (Translation provided by Marks & Clerk).

* cited by examiner

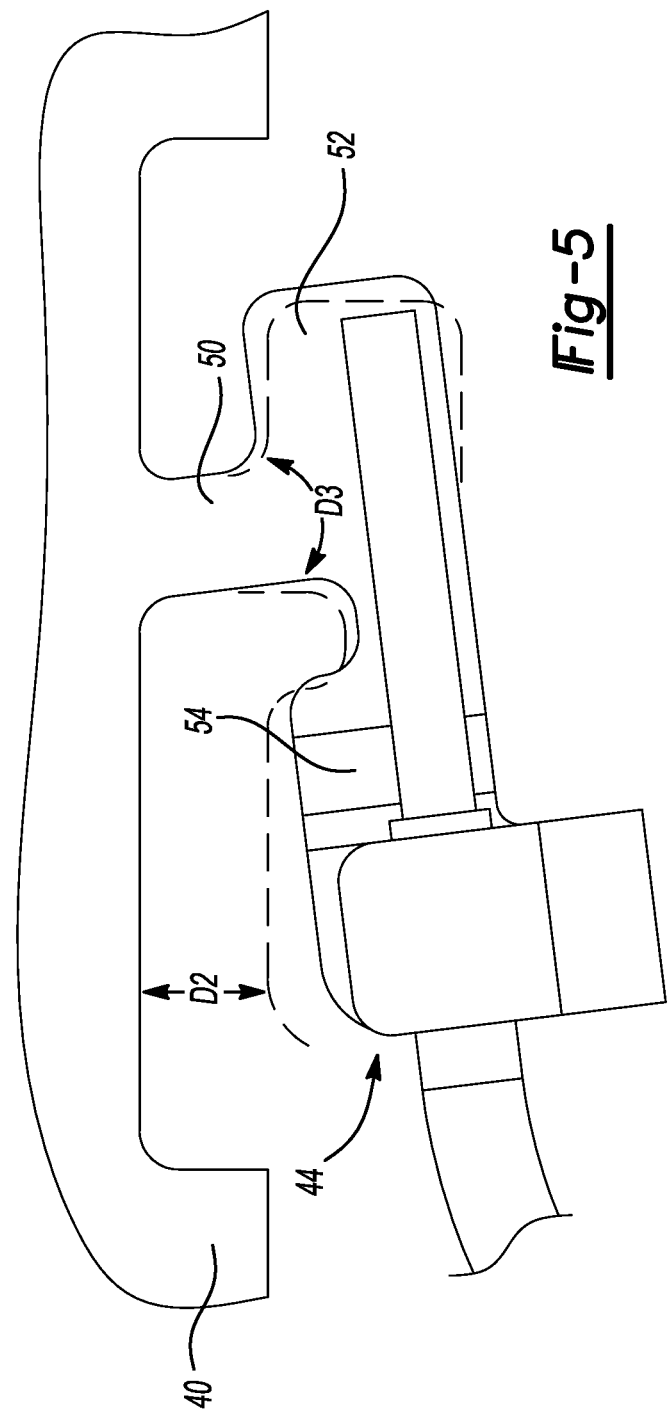

ELECTRICAL DEVICE HAVING BUSBAR WITH FLEXIBLE WELD CRIMP

CROSS-REFERENCE TO RELATED APPLICATIONS

This application claims the benefit of U.S. Provisional Application No. 61/904,630, filed on Nov. 15, 2013. The entire disclosure of the above application is incorporated herein by reference.

FIELD

The present disclosure generally relates to an electrical device having a busbar with a flexible weld crimp.

BACKGROUND

This section provides background information related to the present disclosure which is not necessarily prior art.

Electrical devices often have a busbar with a weld crimp that is employed to mechanically and electrically couple the busbar to a conductor, typically an insulated wire. A crimp-portion of the weld crimp receives the conductor and is deformed so as to provide a primary means for mechanically securing the conductor to the busbar. Typically, the crimp-portion is deformed to an extent that the insulation is significantly compressed so that the crimp-portion applies a clamping force to the conductor that is sufficient to inhibit movement of the conductor in an axial direction (i.e., along the longitudinal axis of the conductor) relative to the weld crimp. The wire can be electrically coupled to a weld portion of the weld crimp in any desired manner, including ultrasonic welding.

During an assembly operation, the connection between the conductor and the weld crimp can be subjected to various forces. Depending on the manner in which these forces are directed, relatively large stresses can be placed on the weld connection between the wire and the weld portion of the weld crimp. Additionally, it may be beneficial in some instances to physically separate the weld crimp from a portion of the busbar that is employed to contact the terminal(s) of an electrical component that is to receive electrical power from and/or transmit electrical power to the busbar.

In view of the above, there remains a need in the art for an improved electrical device having a busbar with a flexible weld crimp.

SUMMARY

This section provides a general summary of the disclosure, and is not a comprehensive disclosure of its full scope or all of its features.

An electrical device according to the principles of the present disclosure includes a frame, a conductor having a conductive element and an electrically insulating cover disposed about at least a portion of the conductive element, and a busbar mounted to the frame. The busbar includes a busbar body and a weld crimp. The weld crimp has a base, which extends from the busbar body, and a cross-member that is coupled to the base on a side of the base that is opposite the busbar body. The cross-member has a weld portion and a crimp portion. The weld portion intersects the base. The crimp portion intersects the weld portion and has a crimp member that receives the conductor. The crimp member is permanently deformed about the conductor so as to apply a clamping force to the conductor. The conductive element is welded to the weld portion.

In one example, the crimp portion is configured to flex relative to the weld portion to relieve stress in the weld between the conductive element and the weld portion when a non-axial force is applied to the conductor. In another example, the weld portion intersects the base at a first intersection, the crimp portion intersects the weld portion at a second intersection, and the weld crimp is configured to flex in at least one of the first intersection and the second intersection to relieve stress in the weld when a non-axial force is applied to the conductor. In one implementation of this example, stress-relieving features are employed at the first and second intersections. In yet another example, the cross-member is physically separate from the busbar body other than a connection to the busbar body through the base, and the weld portion extends past opposite sides of the base. In one implementation of this example, the weld crimp is generally T-shaped.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
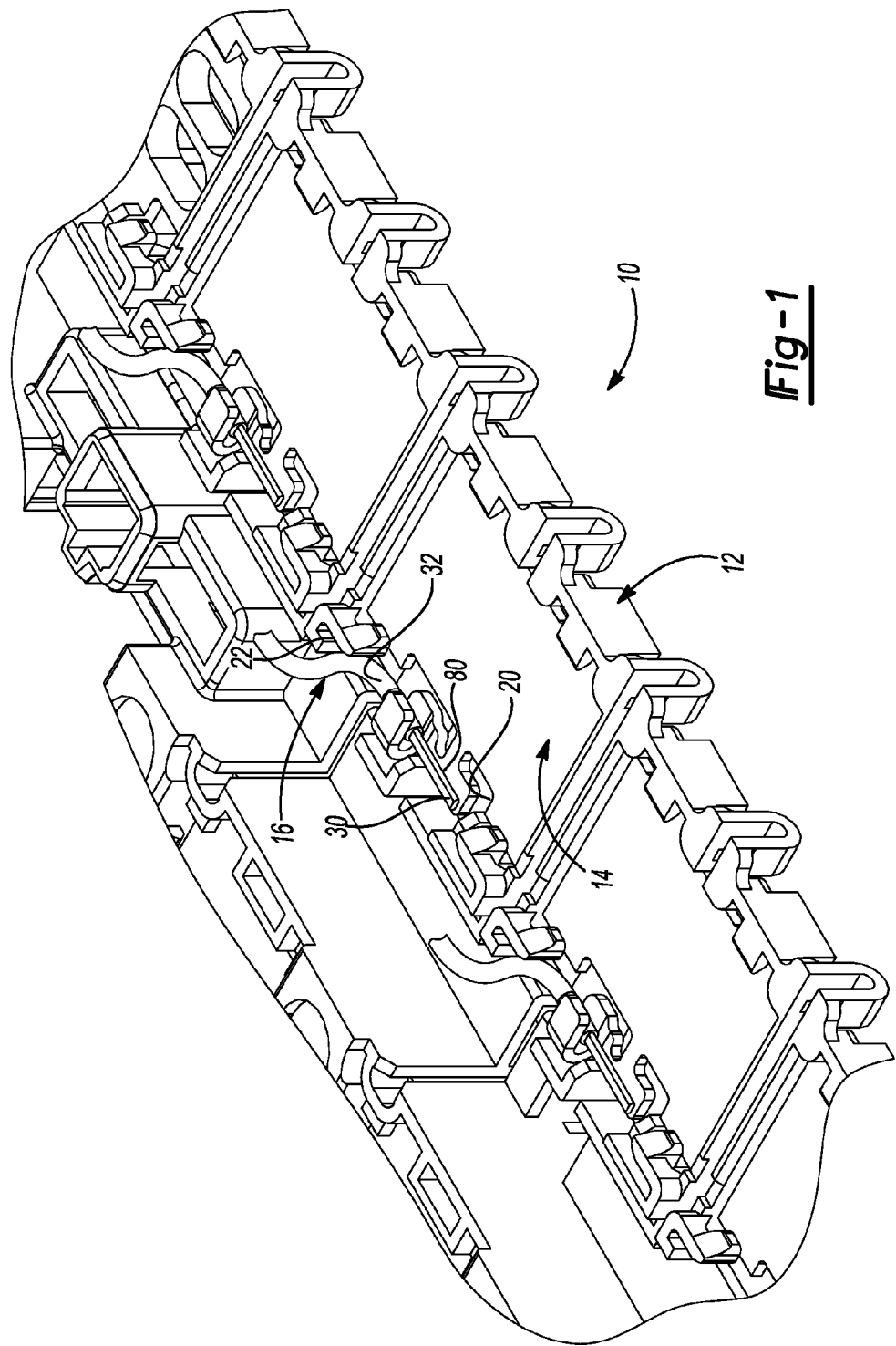
FIG. 1 is a section view of a portion of an electrical device constructed in accordance with the teachings of the present disclosure.
Figure 4:
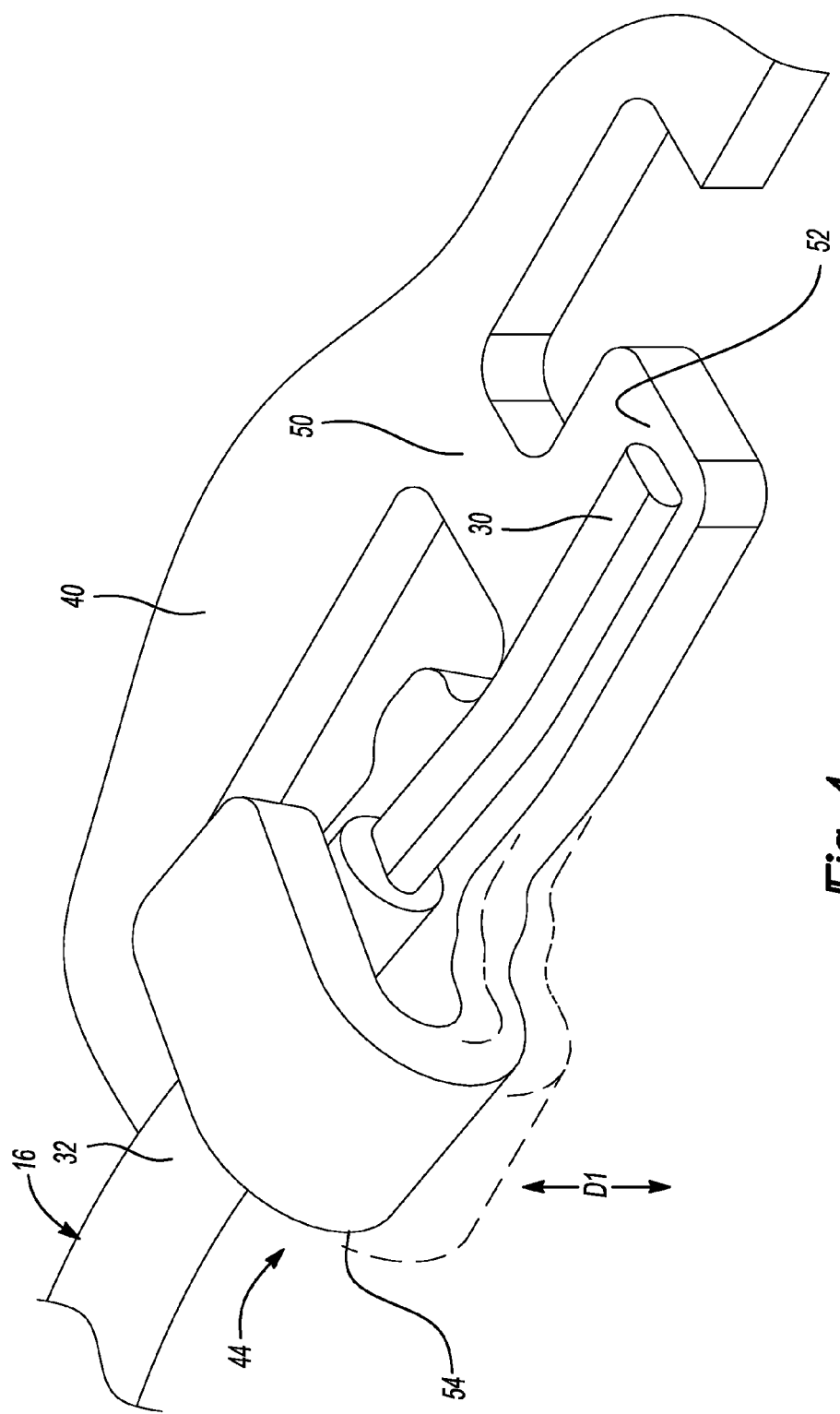

FIG. 4 is a perspective view of a portion of the electrical device of FIG. 1, illustrating a weld crimp of the busbar as coupled to a conductor and deflected in a first direction due to the application of a force to the weld crimp; and FIG. 5 is a top view of a portion of the electrical device of FIG. 1, illustrating a weld crimp of the busbar as coupled to a conductor and deflected in a second direction due to the application of a force to the weld crimp.

Corresponding reference numerals indicate corresponding parts throughout the several views of the drawings.

DETAILED DESCRIPTION

With reference to FIG. 1 of the drawings, an exemplary electrical device constructed in accordance with the teachings of the present disclosure is generally indicated by reference numeral 10. In the particular example provided, the electrical device 10 is a Battery Interconnect Module, but those of ordinary skill in the art will appreciate that the teachings of the present disclosure have application to other types of electrical devices. The electrical device can include a frame 12, a busbar 14 and a conductor 16. The frame 12 can be formed of a suitable structural and electrically insulating material, such as ABS plastic. The frame 12 can define a busbar pocket 20 and a conductor port 22. The busbar pocket 20 can be configured to receive the busbar 14 therein. The conductor port 22 can be configured to receive the conductor 16 and can intersect the busbar pocket 20. Examples of various electrical components include wire conductors, fuses, relays and capacitors.

The conductor 16 can be conventional in its construction and can include a conductive element 30, such as a wire, and an insulating cover 32 that can be disposed about the conductive element 30. A portion of the insulating cover 32 can be stripped, removed, or otherwise omitted from a portion of the conductor 16 to form a bare portion of the conductive element 30 that is to be coupled to the busbar 14.

Figure 2:
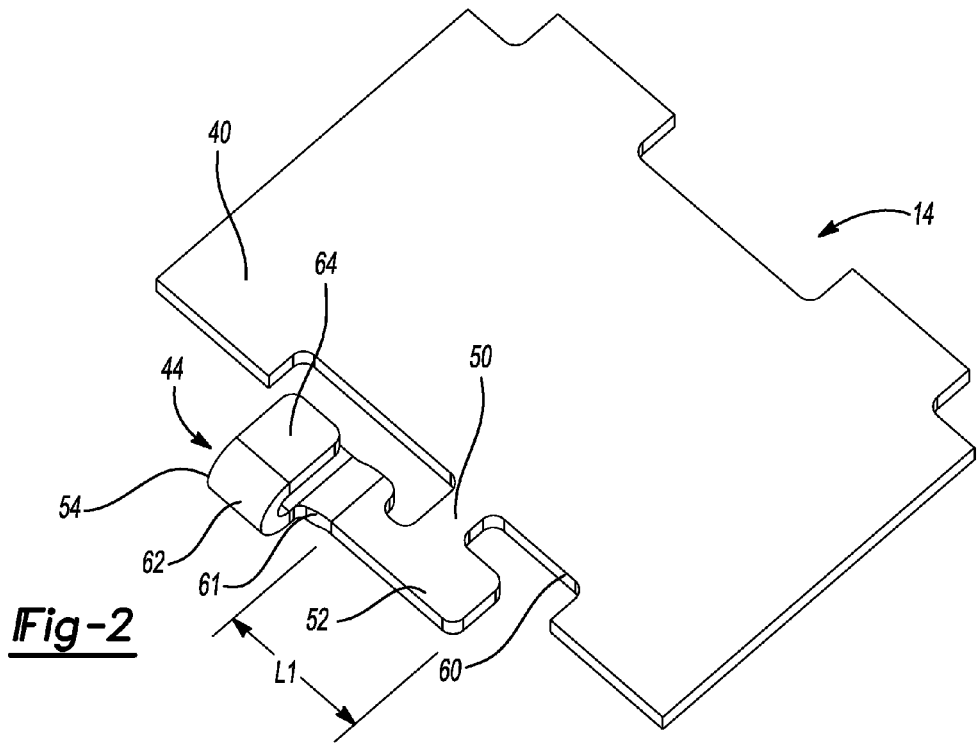
FIG. 2 is a perspective view of a portion of the electrical device of FIG. 1, illustrating a busbar in more detail.

With additional reference to FIG. 2, the busbar 14 can include a body portion 40 and a weld crimp 44. The body portion 40 can be shaped and sized in a manner that is complementary to the busbar pocket 20 to inhibit movement of the busbar 14 relative to the frame 12 once the electrical device 10 has been assembled.

The weld crimp 44 can be coupled to and extend from the body portion 40. The weld crimp 44 can be generally T-shaped, having a base that can be formed by a connection member 50, and a cross-member that can be formed by a weld portion 52 and a crimp portion 54. The connection member 50 can extend from a side or edge 60 of the body portion 40. The cross-member can be physically separate from the body portion 40 other than the indirect connection between the cross-member and the body portion 40 through the connection member 50. The weld portion 52 can be disposed between the connection member 50 and the crimp portion 54. The weld portion 52 can overhang both sides of the connection member 50. To this end, the intersection between the connection member 50 and the weld portion 52 can be located approximately midway along a length L1 of the cross member from an end of the weld portion 52 opposite the crimp portion 54 to a bend 61 in the crimp portion 54. The crimp portion 54 can include a crimp member 62 that can be generally U-shaped and have sides 64 that are slightly offset from the weld portion 52. The crimp member 62 is sized to receive the conductor 16 therein and as such, the sides 64 are offset so as to position the conductor 16 such that the conductive element 30 lies against a plane that is coincident with the surface of the weld portion 52 to which the conductive element 30 is to be affixed. In one example, the sides 64 can be offset from the weld portion 52 such that, when the crimp member 62 receives the insulated portion of the conductive element 30, the bare portion of the conductive element 30 lies against a plane that is coincident with the surface of the weld portion 52 to which the conductive element 30 is to be affixed. In another example, the surface of the weld portion 52 to which the conductive element 30 is to be affixed can lie within a plane located approximately midway between the sides 64 of the crimp member 62.

Figure 3:
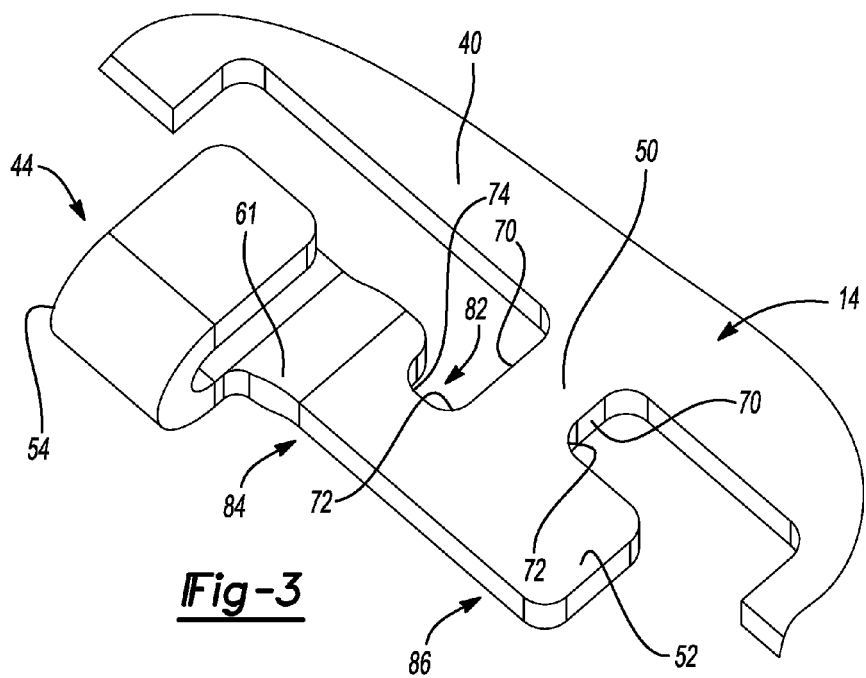
FIG. 3 is an enlarged portion of FIG. 2 showing a weld crimp of the busbar in more detail.

With reference to FIGS. 2 and 3, stress-relieving features are employed in several areas to reduce stresses that may be generated in the busbar 14 during the assembly of the electrical device 10. The stress-relieving features could comprise radii (e.g., rounded corners) or chamfers, for example, and are employed to reduce stress in desired areas of the busbar 14 when the busbar 14 is subjected to certain loads. For example, first stress-relieving features 70 are employed at locations where the side edges of the base intersect corresponding edges of the body portion 40. Configuration in this manner reduces stresses in the area where the base intersects the body portion 40 when the weld crimp 44 is subjected to forces that would tend to twist the connection member 50 about the body portion 40. Second stress-relieving features 72 are employed at locations where the side edges of the weld crimp 44 intersect side edges of the connection member 50. Configuration in this manner reduces stresses in the area where the cross-member intersects the base when the weld crimp 44 is subjected to forces that would tend to twist the cross-member about the base. A third stress-relieving feature 74 is employed at a location where the weld portion 52 intersects the crimp portion 54 on a side of the cross-member that intersects the base. Configuration in this manner permits the crimp portion 54 to flex relative to the weld portion 52 to reduce stresses that would otherwise manifest at the intersection of the weld portion 52 and the connection member 50, and/or at the intersection of the connection member 50 and the body portion 40. As depicted in FIGS. 4 and 5, the configuration of the weld crimp 44 with the various stress-relieving features renders the weld crimp 44 more resistant to stresses produced when forces are applied to the weld crimp 44 that tend to bend or twist the weld crimp 44 relative to the body portion 40, regardless of whether or not the forces are applied so that they act within the plane of the body portion 40 or tend to deflect a portion of the weld crimp 44 out of the plane of the body portion 40.

Returning to FIGS. 1 and 2, it will be appreciated that the busbar 14 can be formed from a single piece of conductive sheet material and that the crimp portion 54 of the weld crimp 44 can be bent and folded to achieve the desired degree of offset and to form the crimp member 62.

The conductor 16 can be received in the weld crimp 44 such that the conductor 16 is received in the crimp member 62 and the bare portion of the conductive element 30 can be abutted against the surface of the weld portion 52. The crimp member 62 can be permanently deformed to compress the insulating cover 32 and apply a clamping force to the conductor 16 that mechanically secures the conductor 16 to the weld crimp 44. The bare portion of the conductive element 30 can be mechanically and electrically secured to the weld portion 52 by a weld 80 that can be formed by any suitable means, including ultrasonic welding.

Returning to FIG. 3, the weld crimp 44 can have a reduced cross-sectional area in locations where flexing is desired to relieve stress in the weld 80 when a non-axial force is applied to the conductor 16. For example, the weld crimp 44 can have a first cross-sectional area at a location 82 where the weld portion 52 intersects the crimp portion 54, and the remainder of the cross-member on opposite sides of the intersection can have a second cross-sectional area. For example, the cross-member can have the second cross-sectional area at locations 84 and 86. The first cross-sectional area can be less than the second cross-sectional area such that the crimp portion 54 flexes relative to the weld portion 52 as shown in FIG. 4 to relieve stress in the weld 80 when a force is applied to the conductor 16 that imparts a load on the crimp portion 54 in a direction D1 perpendicular to a plane in which the body portion 40 resides. In addition, the first cross-sectional area and/or the material of the weld crimp 44 can be selected such that the flexural strength of the weld crimp 44 at the location 82 is less than the peel strength of the weld 80. Thus, the weld crimp 44 can be configured to flex at the location 82 before the weld 80 peels or breaks when a non-axial force is applied to the conductor 16.

The weld crimp 44 can have a third cross-sectional area at the base or connection member 50. The first and third cross-sectional areas can be less than the second cross-sectional area such that the crimp portion 54 flexes relative to the weld portion 52 and the entire cross-member flexes relative to the base as shown in FIG. 5 to relieve stress in the weld 80 when a force is applied to the conductor 16 that imparts a load on the crimp portion 54 in a direction D2 toward or away from the body portion 40. In addition, the base can flex relative to the body portion 40 in a direction D3 when a force is applied to the conductor 16 that imparts a load on the crimp portion 54 in the direction D2. Further, the third cross-sectional area and/or the material of the weld crimp 44 can be selected such that the flexural strength of the weld crimp 44 at the base is less than the peel strength of the weld 80. Thus, the weld crimp 44 can be configured to flex at the base before the weld 80 peels or breaks when a non-axial force is applied to the conductor 16. Moreover, since the cross-member overhangs both sides of the connection member 50, the moment arm between the force acting in the direction D2 and the weld 80 is minimized, which further relieves stress in the weld 80.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical device comprising:
   a frame;
   a conductor having a conductive element and an electrically insulating cover disposed about at least a portion of the conductive element; and
   a busbar mounted to the frame, the busbar comprising a busbar body and a weld crimp, the weld crimp having a base, which extends from the busbar body, and a cross-member that is coupled to the base on a side of the base that is opposite the busbar body, the cross-member having a weld portion and a crimp portion, the weld portion intersecting the base, the crimp portion intersecting the weld portion and having a crimp member that receives the conductor, the crimp member being permanently deformed about the conductor so as to apply a clamping force to the conductor, the conductive element being welded to the weld portion, wherein the crimp portion is configured to flex relative to the weld portion to relieve stress in the weld between the conductive element and the weld portion when a non-axial force is applied to the conductor.

2. The electrical device of claim 1 wherein the flexural strength of the weld crimp at the intersection between the weld portion and the crimp portion is less than the peel strength of the weld between the conductive element and the weld portion.

3. The electrical device of claim 1 wherein the cross-sectional area of the weld crimp at the intersection between the weld portion and the crimp portion is less than the cross-sectional area of the remainder of the weld crimp.

4. The electrical device of claim 1 wherein the weld crimp has a first cross-sectional area at the intersection between the weld portion and the crimp portion, and the remainder of the weld crimp has a second cross-sectional area that is greater than the first cross-sectional area.

5. The electrical device of claim 4 wherein the base has a third cross-sectional area that is less than the second cross-sectional area.

6. The electrical device of claim 1 wherein the busbar includes rounded corners at locations where side edges of the base intersect corresponding edges of the busbar body.

7. The electrical device of claim 1 wherein the weld crimp includes rounded corners at locations where side edges of the weld portion intersect corresponding edges of the base.

8. The electrical device of claim 1 wherein the weld crimp includes a rounded corner at a location where side edges of the crimp portion intersect corresponding edges of the weld portion.

9. An electrical device comprising:
   a frame;
   a conductor having a conductive element and an electrically insulating cover disposed about at least a portion of the conductive element; and
   a busbar mounted to the frame, the busbar comprising a busbar body and a weld crimp, the weld crimp having a base, which extends from the busbar body, and a cross-member that is coupled to the base on a side of the base that is opposite the busbar body, the cross-member having a weld portion and a crimp portion, the weld portion intersecting the base at a first intersection, the crimp portion intersecting the weld portion at a second intersection, the crimp portion having a crimp member into which the conductor is received, the crimp member being permanently deformed about the conductor so as to apply a clamping force to the conductor, the conductive element being welded to the weld portion, wherein the weld crimp is configured to flex in at least one of the first intersection and the second intersection to relieve stress in the weld between the conductive element and the weld portion when a non-axial force is applied to the conductor.

10. The electrical device of claim 9 wherein the weld crimp is configured to flex at the first intersection when a force is applied to the conductor which imparts a load on the crimp portion in a direction toward or away from the busbar body.

11. The electrical device of claim 9 wherein the weld crimp is configured to flex at the second intersection when a force is applied to the conductor which imparts a load on the crimp portion in a direction perpendicular to a plane in which the busbar body resides.

12. The electrical device of claim 9 wherein the weld crimp has a reduced cross-sectional area in at least one of the first intersection and the second intersection.

13. The electrical device of claim 9 wherein the crimp member is generally U-shaped and has sides that are spaced apart to receive the portion of the conductive element about which the insulating cover is disposed.

14. The electrical device of claim 13 wherein the sides of the crimp member are offset from the weld portion such that, when the crimp member receives the insulated portion of the conductive element, a bare portion of the conductive element lies against a plane that is coincident with a surface of the weld portion to which the conductive element is welded.

15. The electrical device of claim 14 wherein the conductive element is welded to a surface of the weld portion that lies within a plane located approximately midway between the sides of the crimp member.

16. An electrical device comprising:
    a frame;
    a conductor having a conductive element and an electrically insulating cover disposed about the conductive element; and
    a busbar mounted to the frame, the busbar comprising a busbar body and a weld crimp, the weld crimp having a base, which extends from the busbar body, and a cross-member that is coupled to the base on a side of the base that is opposite the busbar body, the cross-member being physically separate from the busbar body other than a connection to the busbar body through the base, the cross-member having a weld portion and a crimp portion, the weld portion intersecting the base and extending past opposite sides of the base, the crimp portion being coupled to an end of the weld portion opposite the base, the crimp portion having a crimp member into which the conductor is received, the crimp member being permanently deformed about the conductor so as to apply a clamping force to the conductor, the conductive element being welded to the weld portion.

17. The electrical device of claim 16 wherein the intersection between the base and the weld portion is located approximately midway along a length of the cross-member.

18. The electrical device of claim 16 wherein the weld crimp is generally T-shaped.

19. The electrical device of claim 16 wherein the frame defines a busbar pocket configured to receive the busbar body, and the busbar body is shaped and sized in a manner that is complementary to the busbar pocket to inhibit movement of the busbar relative to the frame once the electrical device has been assembled.

20. The electrical device of claim 16 wherein the busbar is formed from a single piece of conductive sheet material.

\* \* \* \* \*